June 27, 1967 E. F. BROWN 3,328,702
PULSE TRAIN MODIFICATION CIRCUITS
Filed March 31, 1965

INVENTOR
E. F. BROWN
BY
[signature]
ATTORNEY 3,328,702

PULSE TRAIN MODIFICATION CIRCUITS

Earl F. Brown, Piscataway Township, Middlesex County, N.J., assignor to Bell Telephone Laboratories, Incorporated, New York, N.Y., a corporation of New York Filed Mar. 31, 1965, Ser. No. 444,214
5 Claims. (Cl. 328—39)

Figure 1:
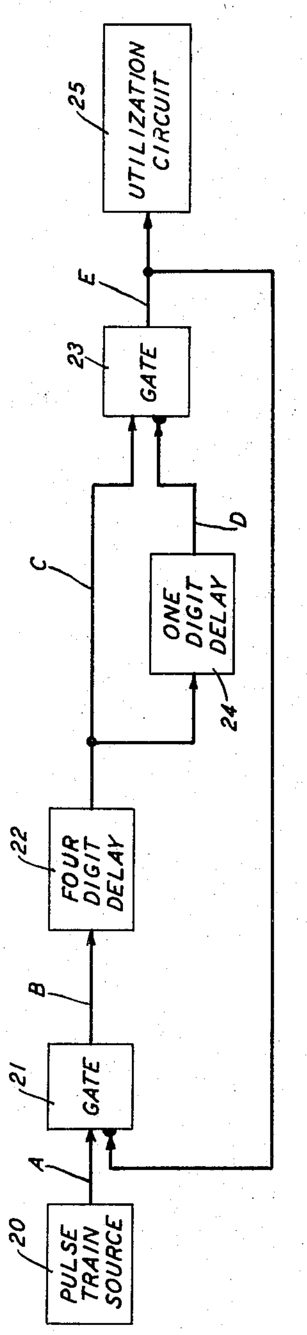

This invention relates to pulse train modifying circuits and, in particular, to such circuits that may be used as pulse rate dividers.

Digital type equipments frequently require pulses occurring at specified intervals to effect synchronization within the equipments. Some of these pulses are produced by pulse train modifying circuits that respond to input trains of timing or clock pulses to produce groups of pulses at periodic intervals. An example of a pulse train modifying circuit is a pulse rate divider. In a pulse rate divider, an output pulse is produced each time a fixed number of clock pulses occurs with the result that the train of output pulses has a repetition rate which is a submultiple of that of the clock pulse train.

Various pulse train modifying circuits exist in the prior art. These circuits are often found to lack a desired versatility or reliability because of their complex structures.

An object of the present invention is to produce modified forms of pulse trains in a relatively simple and versatile manner.

This and other objects of the invention are accomplished through the use of a transmission path which is selectively inhibited in response to a train of input pulses so as not to pass predetermined pulses in the input pulse train. The selective inhibiting of the path is achieved through the novel use of transmission gates, delay circuits and a feedback path.

In one of its broader aspects the invention takes the form of a transmission path that includes a normally enabled gate to which a train of pulses at a substantially constant repetition rate is applied. The transmission path also includes a pulse selecting circuit responsive to groups of pulses, where the pulses in each group occur at the repetition rate of the train of input pulses, to produce pulses corresponding in time to at least the first pulse in each group of pulses. Connecting paths, which include at least one delay circuit, are connected between the gate and the pulse selecting circuit to apply both the output of the gate as an input to the pulse selecting circuit and the output of the pulse selecting circuit as an inhibiting input to the gate. The output of the pulse selecting circuit comprises the output of the transmission path. In operation the gate divides the input pulse train into groups of pulses by, in effect, blocking pulses in the input pulse train. The pulse selecting circuit, on the other hand, passes to an output terminal one or more specific pulses in each of the groups of pulses. The connecting paths feed pulses to the gate and the pulse selecting circuit at the correct times to effect these operations.

A feature of the invention is that certain embodiments may be used as pulse rate dividers. One such embodiment which produces an output pulse in response to every $n$ input pulses includes a pair of normally enabled transmission gates, each of which has an inhibit input terminal. The input pulses are applied to the transmission input terminal of a first of these gates. The output of the first gate is passed through a first delay circuit to the transmission input of the second gate. This first delay circuit provides a delay interval equal to $(n-1)$ periods of the input pulse train, which in the art would be referred to as an $(n-1)$ digit delay. The pulses applied to the transmission input of the second gate are also passed through a delay circuit, that provides a one digit delay, to the inhibiting input of the second gate. The output of the second gate, which is the output of the divider, is applied to the inhibit input of the first gate. In operation the first pulse out of the first delay line passes through the second gate while the pulses immediately following this pulse are blocked by the second gate. The pulse passed by the second gate is applied to the inhibit input of the first gate to block the passage of the $n$th input pulse. Pulses immediately following the $n$th input pulse are passed by the first gate, delayed by the first delay line and applied to the second gate. Only the first pulse appearing in this second group of pulses is passed by the second gate. This pulse is applied to the first gate inhibit input terminal which blocks the passage of the second $n$th input pulse. This action is repetitive as long as input pulses are applied with the result that the output pulses occur at a repetition rate equal to the repetition rate of input pulses divided by $n$.

Other objects and features of the invention will become apparent from the following detailed description of a specific embodiment.

Figure 2:
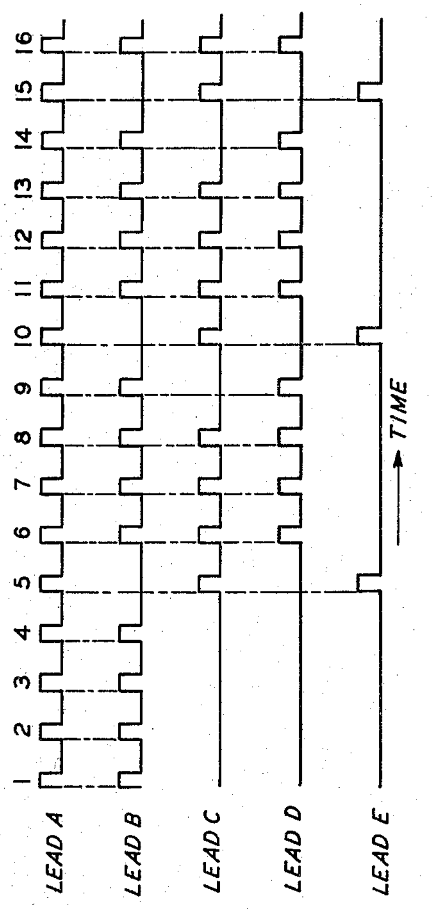

In the drawings:

FIG. 1 is a schematic diagram of one embodiment of the invention which embodiment operates as a pulse rate divider; and FIG. 2 illustrates waveforms appearing on various leads within the embodiment of FIG. 1.

The embodiment of the invention whose schematic diagram is shown in FIG. 1 is a pulse rate divider. The particular values shown for the delay circuit within the embodiment cause the embodiment to produce an output pulse train whose repetition rate is one-fifth of the input pulse train.

Referring in detail to FIG. 1, there is shown a pulse train source 20 whose output is applied by a lead A to the transmission input of a normally enabled gate 21. The output of a gate 21 is applied by a lead B to a delay circuit 22 which provides a four digit delay. A lead C applies the output of delay circuit 22 to the transmission input of a normally enabled gate 23 and also to the input of a delay circuit 24 that provides a one digit delay. The output of delay circuit 24 is applied to an inhibit input of gate 23 by a lead D. A lead E applies the output of gate 23 to a utilization circuit 25 and also to an inhibit input of gate 21.

The operation of the embodiment depicted by FIG. 1 may be better understood by referring to waveforms shown in FIG. 2. These waveforms are shown in time alignment and represent the output pulses on leads A through E of the circuit of FIG. 1. For purposes of explanation the time represented by each column of pulses is referred to as a time slot with the time slots numbered as illustrated.

The lead A waveform of FIG. 2 represents a train of pulses to be modified where the first pulse in the train falls in time slot 1. Since input pulses were not present prior to time slot 1 and delay circuit 22 provides a four digit delay, pulses cannot appear on lead E during the first four time slots. Gate 21 therefore remains in its normally enabled state during at least the first four time slots and four pulses appear on lead B in time slots 1 through 4, respectively. Because of delay circuit 22, lead B pulses in time slots 1 through 4 cause pulses to be produced on lead C in time slots 5 through 8, respectively. Lead C pulses in time slots 5 through 8, in cooperation with delay circuit 24, cause pulses to appear on lead D in time slots 6 through 9, respectively. Because lead C has a pulse in time slot 5, while lead D does not have a pulse in this time slot, gate 23 remains in its enabled state at this time and a pulse appears on lead E in the fifth time slot. Lead D pulses in time slots 6, 7 and 8 inhibit gate 23, thereby preventing pulses from appearing on lead E in response to the pulses in time slots 6, 7 and 8 on lead C.

The lead E pulse in time slot 5 causes gate 21 to be disabled so that a pulse cannot appear on lead B in time slot 5. At the termination of the fifth time slot pulse on lead E gate 21 is again enabled. Lead A pulses in time slots 6 through 9 therefore cause pulses to appear on lead B in time slots 6 through 9, respectively. These pulses, in cooperation with delay circuit 22, cause pulses to appear on lead C in time slots 10 through 13, respectively.

The last-mentioned pulses on lead C, in cooperation with delay circuit 24, cause pulses to appear on lead D in time slots 11 through 14, respectively. Since a pulse does not appear in time slot 10 on lead D, gate 23 is in its enabled state and the pulse in time slot 10 on lead C causes a pulse to appear in time slot 10 on lead E. Lead D pulses in time slots 11, 12 and 13 inhibit gate 23 and thereby prevent pulses from appearing on lead E in response to the pulses in time slots 11, 12 and 13 on lead C.

The action described in the two previous paragraphs is repetitive as long as the pulse train on lead A continues, with the result that the train of pulses produced on lead E has a repetition rate which is one-fifth of that of the input pulse train. The dividing rate may be changed by changing the delay provided by delay circuit 22. In general, if the desired dividing rate is represented by $n$, then the digit delay provided by delay circuit 22 should equal $(n-1)$.

The disclosed embodiment causes the first pulse in the output pulse train to occur coincident with the fifth (i.e. the $n$th) input pulse. The invention permits the first pulse of the output train to be aligned with any of the earlier input pulses. This is accomplished by placing part or all of the delay of delay circuit 22 in the feedback path. Placing all of the delay in the feedback path, for example, causes the first output pulse to coincide with the first input pulse. Other divisions of the delay between the two paths cause the first output pulse to coincide with input pulses intermediate of the two above-described extremities.

The disclosed embodiment causes a single output pulse to appear for each cycle of its operation. Two or more pulses in respective time slots may be made to appear for each of its cycles of operation by increasing the delay provided by delay circuit 24. When this delay circuit provides a two digit delay, for example, output pulses appear on lead E in time slots 5 and 6, 11 and 12, 17 and 18 and so on. In general, expressions for the time slots occupied by the pulses are $[m(n+2)-1]$ and $[m(n+2)]$, where $m$ represents the number of a specific group of pulses in the output train and $n$ represents the digit delay provided by delay circuit 22. Similar expressions exist for other values for delay circuit 24.

The operation of the disclosed embodiment has been presented through the use of ideally shaped and timed pulses. As readily recognized by those skilled in the art these conditions do not exist in practice. Conventional and well-known techniques should therefore be employed when constructing embodiment of the invention to assure that the timing of the disabling and enabling of the gates within the embodiment is correct in accordance with the above teachings.

Although a specific embodiment of the invention and several modifications thereof have been described in detail, it is to be understood that other embodiments may be devised by those skilled in the art without departing from the spirit and scope of the invention.

What is claimed is:

1. In combination, a source of pulses, a normally enabled gating means having a transmission input terminal, a disabling input terminal and an output terminal with said transmission input terminal connected to said pulse source, circuit means having input and output terminals and responsive to input pulses to produce an output pulse in response to each input pulse only when an input pulse has not occurred within a preceding predetermined interval, first means connected between said gating means output terminal and said circuit means input terminal, second means connected between said circuit means output terminal and said disabling input terminal of said gating means, at least one of said first and second means including a serially connected delay means, and utilization means connected to said circuit means output terminal.

2. In combination, a source of pulses, first and second normally enabling gating means, each having a transmission input terminal, a disabling input terminal and an output terminal, first means connecting said first gating means transmission input terminal to said source, delay means connected between said second gating means transmission and disabling input terminals, second means connected between said first gating means output terminal and said second gating means transmission input terminal, third means connected between said second gating means output terminal and said disabling input terminal of said first gating means, at least one of said second and third means including a serially connected delay means, and utilization means connected to said circuit means output terminal.

3. In combination, first means for producing pulses at a substantially constant repetition rate and having a disabling input terminal, second means responsive to groups of pulses at said substantially constant repetition rate to produce output pulses corresponding in time to at least the first pulse in each of said groups of pulses, third means including delay means connected between said first and second means to apply both the output of said first means as an input to said second means and the output of said second means as a disabling input to said first means, and utilization means connected to said second means.

4. In combination, a source of pulses, a first gating means having a pair of input terminals and an output terminal with a first of said input terminals connected to said source of pulses, a second gating means having a pair of input terminals and an output terminal, a first delay means connected between said first gating means output terminal and a first of said second gating means input terminals, a second delay means, means connecting said second delay means between said first and the second input terminals of said second gating means and responsive to pulses appearing on said first input terminal of said second gating means to prevent said second gating means from producing an output pulse during a given period following a predetermined interval after a pulse appears on said first terminal of said second gating means, means connecting said second gating means output to the second input terminal of said first gating means and responsive to said second gating means output pulses to prevent said first gating means from producing an output pulse for a predetermined period after each of said second gating means output pulses, and utilization means connected to the output of said second gating means.

5. In combination, first and second gates each having a transmission input terminal, an inhibit input terminal and an output terminal, first and second delay means connected in series in that order between said first gate output terminal and said second gate inhibit input terminal, means connecting said second gate transmission input terminal to the junction between said first and second delay means, means connecting said second gate output terminal to said first gate inhibit input terminal, a source of pulses connected to said first gate transmission input terminal, and utilization means connected to said second gate output terminal.

No references cited.

ARTHUR GAUSS, *Primary Examiner.*

B. P. DAVIS, *Assistant Examiner.*